United States Patent
Wang et al.

(10) Patent No.: US 9,496,989 B2
(45) Date of Patent: Nov. 15, 2016

(54) CROSS-LAYER AND CROSS-APPLICATION ACKNOWLEDGMENT FOR DATA TRANSMISSION

(71) Applicant: Convida Wireless, LLC, Wilmington, DE (US)

(72) Inventors: Chonggang Wang, Princeton, NJ (US); Qing Li, Princeton, NJ (US); Zongrui Ding, Portland, OR (US); Hongkun Li, King of Prussia, PA (US); Paul L. Russell, Jr., Pennington, NJ (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 133 days.

(21) Appl. No.: 14/310,772

(22) Filed: Jun. 20, 2014

(65) Prior Publication Data

US 2014/0376521 A1 Dec. 25, 2014

Related U.S. Application Data

(60) Provisional application No. 61/837,746, filed on Jun. 21, 2013.

(51) Int. Cl.
*H04L 1/00* (2006.01)
*H04L 1/16* (2006.01)
*H04L 29/08* (2006.01)
(Continued)

(52) U.S. Cl.
CPC ........... *H04L 1/1664* (2013.01); *H04L 1/1607* (2013.01); *H04L 1/1864* (2013.01); *H04L 69/321* (2013.01); *H04L 69/324* (2013.01); *H04W 4/005* (2013.01)

(58) Field of Classification Search
CPC . H04L 1/1664; H04L 69/324; H04L 69/321; H04L 1/1607; H04L 1/1864; H04W 4/005
See application file for complete search history.

(56) References Cited

U.S. PATENT DOCUMENTS

| 2011/0110230 A1* | 5/2011 | Zhuang | H04L 1/1867 370/230 |
| 2012/0218949 A1* | 8/2012 | Kim | H04L 1/1664 370/329 |
| 2013/0155938 A1* | 6/2013 | Smith | H04L 69/163 370/315 |

(Continued)

OTHER PUBLICATIONS

Wang et al., "Improving TCP Performance Using Cross-Layer Feedback in Wireless LANs", Wireless Communications Networking and Mobile Computing (WiCOM), 2010 6th International Conference on, Sep. 23-25, 2010.*

(Continued)

*Primary Examiner* — Clemence Han
(74) *Attorney, Agent, or Firm* — Baker & Hostetler LLP

(57) ABSTRACT

Systems and methods may integrate acknowledgments, such as application-level acknowledgments and medium access control layer acknowledgments. In an embodiment of a cross-layer acknowledgment method, a medium access control layer acknowledgment and application-layer acknowledgment may be integrated as a single medium access control layer acknowledgment. In an embodiment of a cross-application acknowledgment method, an application-layer acknowledgment for a first application and application-layer acknowledgment for a second application may be integrated into a single medium access control layer frame.

18 Claims, 17 Drawing Sheets

(51) Int. Cl.
  *H04L 1/18*   (2006.01)
  *H04W 4/00*   (2009.01)

(56) References Cited

U.S. PATENT DOCUMENTS

2013/0235781 A1* 9/2013 Dangui ............... H04L 1/1614
                                                 370/312
2014/0269360 A1* 9/2014 Jafarian ............ H04W 52/0209
                                                 370/252

OTHER PUBLICATIONS

Brzozowski et al, "Impact—A Family of Cross-Layer Transmission Protocols for Wireless Sensor Networks", Performance, Computing, and Communications Conference, 2007. IPCCC 2007, IEEE International, IEEE, Apr. 1, 2007, 619-625.
Cho, S., IEEE P802.15 Working Group for Wireless Personal Area Networks (WPANs), "Peer Aware Communications (PAC) Task Group Minutes for Sep. 2013", IEEE 802.15.8, Sep. 26, 2013, 5 pages.
IEEE Standard for Information technology—Telecommunications and Information Exchange Between Systems Local and Metropolitan Area Networks—Specific Requirements, Part 11: Wireless LAN Medium Access Control (MAC) and Physical Layer (PHY) Specifications; IEEE Std 802.11™-2012, Mar. 29, 2012, 2793 pages.
IEEE Standard for Local and Metropolitan Area Networks—Part 15.4: Low-Rate Wireless Personal Area Networks (LR-WPANs), IEEE Std 802.15.4™-2011, Sep. 5, 2011, 314 pages.
IEEE Standard for Local and metropolitan area networks—Part 15.4: Low-Rate Wireless Personal Area Networks (LR-WPANs); Amendment 5: Physical Layer Specifications for Low Energy, Critical Infrastructure Monitoring Networks; IEEE Std 802.15.4k™-2013, Jun. 14, 2013, 149 pages.
IEEE Standard for Local and metropolitan area networks—Part 15.4: Low-Rate Wireless Personal Area Networks (LR-WPANs) Amendment 1: MAC sublayer, IEEE Std 802.15.4e™-2012, Apr. 16, 2012.
International Application No. PCT/US2014/043460: International Search Report and the Written Opinion dated Nov. 18, 2014, 17 pages.
Lee et al, "Cross-layer Design for Fast TCP ACK-Clocking over WiMedia UWB Networks", Consumer Electronics, 2008. ICCE 2008. Digest of Technical Papers. International Conference on, IEEE, Piscataway, NJ, USA, Jan. 9, 2008, 1-2.
Shelby et al, "Constrained Application Protocol (CoAP) draft-ietf-core-coap-17", CoRE Working Group, May 26, 2013, 119 pages.
Wang et al, "A cross-layer scheme to improve TCP performance in UMTS with packet scheduling", Vehicular Technology Conference, 2005, IEEE 62nd Dallas, TX, vol. 4, Sep. 25-28, 2005, 2571-2574.
Wang et al, "Improving TCP Performance Using Cross-Layer Feedback in Wireless LANs", Wireless Communications Networking and Mobile Computing (WICOM), 2818 6th International Conference on, IEEE, Sep. 23, 2010, 1-4.
Xue et al, "CAPOT: A Cross-Layer MAC Protocol for One-Way TCP Flow in Wireless Mesh Networks", 2012 8th International Conference on Wireless Communications, Networking and Mobile Computing (WICOM 2012): Shanghai, China, Sep. 21-23, 2012, IEEE, Piscataway, NJ.
Yabandeh et al, "E2E-PACK: A Cross-Layer Design for Multipath Routing Over Mobile Ad Hoc Networks", Communication Systems Software and Middleware, 2007. COMSWARE 2007. 2nd International Conference on, IEEE, PI, Jan. 1, 2007, 1-6.

* cited by examiner (Prior Art Message Flow)

CROSS-LAYER AND CROSS-APPLICATION ACKNOWLEDGMENT FOR DATA TRANSMISSION

CROSS-REFERENCE TO RELATED APPLICATIONS

This application claims the benefit of U.S. Provisional Patent Application No. 61/837,746, filed on Jun. 21, 2013, entitled "METHODS OF CROSS-LAYER AND CROSS-APPLICATION ACKNOWLEDGMENT FOR DATA TRANSMISSION IN PROXIMITY COMMUNICATIONS," the contents of which are hereby incorporated by reference herein.

BACKGROUND

The Internet of Things (IoT) introduces objects or things to Human-to-Human (H2H) based Internet services. It marks a stage of the Internet where physical or virtual objects are interconnected to enable the Internet of Services (IoS). Many of these services are proximity based, such as smart shopping, smart home, smart office, smart health, smart transportation, smart parking, smart grid, and smart city, among other things.

Proximity services may be based on peer-to-peer (P2P) communications in proximity. P2P devices include tablets, smart phones, music players, game consoles, personal digital assistances, laptops/PCs, medical devices, connected cars, smart meters, sensors, gateways, monitors, alarms, set-top boxes, printers, Google glasses, drones, and service robots, among other things. A P2P communication system may be a central system with a controller or core network serving as an infrastructure, or a distributed system without a controller or core network serving as the infrastructure. Proximity services may include human-to-human (H2H) proximity services, machine-to-machine (M2M) proximity services, machine-to-human (M2H) proximity services, human-to-machine (H2M) proximity services, and network of network proximity services.

Proximity-based applications and services represent a trend to offload heavy local internet traffic from a core infrastructure as well as provide the connections to an infrastructure via multi-hopping. Many standards have identified proximity services use cases as part of their standardization working groups, such as 3GPP, oneM2M, IETF, IEEE, and OMA. Service layer, as well as cross-layer techniques, is an area of standardization to enable these services.

Proximity services may use wireless networks that have varying acknowledgement (i.e., ACK) mechanisms for reliable data transmission as specified in IEEE 802.15 and IEEE 802.11 standard series.

"IEEE 802.15.4e, MAC Enhancement for IEEE 802.15.4-2006" ACK information element (IE) is defined for the coordinator to acknowledge multiple data frames transmitted in guaranteed time slot (GTS). Group ACK serves to allocate a new time slot for retransmission. An ACK frame can contain additional contents as IEs. Multi-channel adaptation and switch are defined for a sender and receiver pair to switch their communication channel.

In "IEEE 802.15.4k in PHY/MAC Amendment for Low Energy Critical Infrastructure Networks," increment ACK (LACK) is defined to assist reliable MAC fragments transmission. Each LACK indicates both successfully transmitted fragments and failed fragments. LACK can be described as a combination of ACK and NACK.

In IETF Constrained Application Protocol (CoAP), there is ACK and retransmission in the CoAP protocol. In essence, a CoAP client first sends a request to a CoAP server. Then the CoAP server needs to send an ACK back to the CoAP client if the request needs to be confirmed. In addition, CoAP server can also piggyback a response together with the ACK. Such ACK and response are CoAP-level functions related to applications, which are completely independent of MAC-layer ACK. No matter whether there is MAC-layer ACK or not, CoAP protocol will work in such ways: separated CoAP ACK and CoAP response or piggybacked CoAP ACK and CoAP response as specified in IETF CoAP.

The conventional acknowledgement (e.g., ACK) mechanisms for reliable data transmission, such as the above, may be further optimized.

SUMMARY

MAC-layer acknowledgements in conventional protocols is application oblivious or application independent. Disclosed herein are systems and methods that integrate acknowledgments, such as application-level acknowledgments and medium access control layer acknowledgments. In an embodiment, an integrated acknowledgment is leveraged to serve both medium access control layer acknowledgment and application-layer acknowledgment. In another embodiment, the integrated acknowledgment may be leveraged to acknowledge multiple applications in the same ACK frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

MAC-layer acknowledgements in conventional protocols is application-oblivious or application-independent. Disclosed herein are methods and systems that integrate and optimize application-level ACK (e.g., CoAP-level ACK) and MAC-layer ACK (e.g., IEEE 802.15.4 ACK). The optimizations may be achieved by defining an integrated ACK message that can reduce the number of messages that are required between a sender and a receiver. As discussed herein, an integrated MAC ACK may include a cross-layer ACK, a cross-application ACK, or a cross-layer cross-application ACK.

ACK-based retransmission mechanisms exist in most MAC protocols, such as IEEE 802.15 and IEEE 802.11 series, to provide one-hop reliable transmission in MAC layer. Higher layer protocols (e.g. TCP, CoAP) also provide end-to-end (multi-hop or one-hop) reliable transmission based on an end-to-end ACK mechanism. However, the MAC layer retransmission and application-layer retransmission are independent of each other. In other words, MAC layer retransmission is based on MAC layer ACK and higher-layer retransmission is solely based on application-layer ACK, as discussed in further detail below.

For proximity communications where most applications occur within one-hop, although multi-hop is sometimes required, it turns out that the independently treated MAC layer retransmission and higher layer retransmission may be redundant. There are MAC layer ACK messages in most MAC protocols (e.g., IEEE 802.15.4) that have no use to the application layer. The number of messages may be reduced by allowing "application data" to be piggybacked in the MAC layer ACK. "Application data" may be an application ACK.

Methods and system discussed herein disclose how to coordinate and optimize MAC layer transmission (or retransmission) and higher layer transmission (or retransmission) mechanisms for multiple applications. Acknowledgement mechanisms for reliable data transmission for proximity communications, such as cross-layer ACK, cross-application ACK, and cross-layer cross-application ACK are explained in more detail below. Also, as discussed in more detail herein, application data means data from layers higher than the MAC layer, such as layer 4 (e.g., TCP, SCTP, etc.), layer 5 (e.g., CoAP, HTTP, etc.), or other layers higher than the MAC layer. Application ACK means the ACK for application data. The disclosed methods and systems may have impact to MAC layer protocols, such as IEEE 802.15.8, IEEE 802.15.4, or IEEE 802.11x.

Figure 1A:
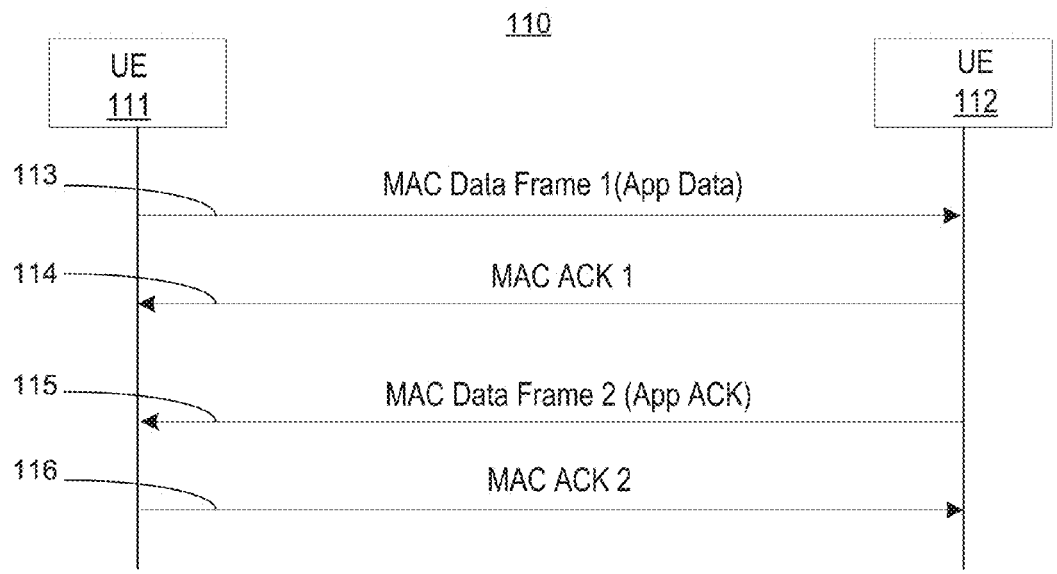
FIG. 1A illustrates a single-hop message flow without use of cross-layer ACK.
Figure 1B:
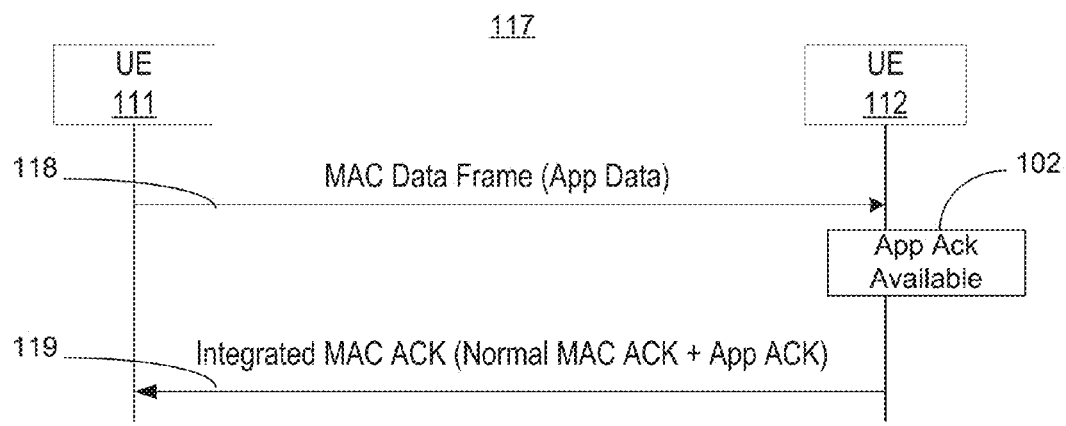
FIG. 1B illustrates a single-hop message flow with use of cross-layer ACK.

Cross-layer ACK involves MAC layer ACK (e.g., IEEE 802.15.4) and application layer ACK (e.g., CoAP) that are integrated as a single MAC layer ACK (hereinafter an Integrated MAC ACK). An integrated ACK is leveraged to serve both MAC-layer acknowledgment and application-layer acknowledgment. FIG. 1A and FIG. 1B illustrates scenarios where communication between user equipment (UE) is within one-hop. A UE, as discussed herein, may be considered a mobile station, a fixed or mobile subscriber unit, a pager, a cellular telephone, a personal digital assistant (PDA), a smartphone, a laptop, a netbook, a personal computer, a wireless sensor or actuator, consumer electronics, medical devices, automobiles, and the like.

FIG. 1A illustrates a conventional message flow 110 that does not use cross-layer ACK. UE 111 may be considered a sender UE while UE 112 may be considered a receiver UE. At step 113, UE 111 sends to UE 112 a MAC data frame that includes application data. At step 114, UE 112 sends to UE 111 a MAC ACK, which acknowledges to UE 111 that UE 112 received the MAC data frame of step 113. At step 115, UE 112 sends a MAC data frame that includes an application ACK, which acknowledges to UE 111 that UE 112 received the application data of step 113. At step 116, UE 111 sends UE 112 a MAC ACK, which acknowledges receiving the MAC frame of step 115.

The conventional message flow 111 illustrates that two MAC ACK frames (at step 114 and step 116) are required for the two MAC data frames that contain MAC application data (at step 113 and step 115). In total, as shown in FIG. 1A, there are four messages between UE 111 and UE 112. The application data of step 113 may be an application request and application ACK of step 115 may be an application response.

FIG. 1B illustrates a message flow 117 where the UEs use cross-layer ACK. At step 118, UE 111 sends to UE 112 a MAC data frame that includes application data. At step 102, App ACK for application data of step 118 becomes available on UE 112. At step 119, UE 112 sends to UE 111 an integrated MAC ACK. The integrated MAC ACK of step 119 is one message that includes a "normal" MAC ACK (similar to the MAC ACK of step 114) and a "normal" application ACK (similar to the application ACK of step 115). In other words, the Integrated MAC ACK of step 119 serves two purposes simultaneously. It serves the purpose to acknowledge the previous MAC data frame of step 118 from UE 111 to UE 112. In addition, the integrated MAC ACK of step 119 acknowledges the application data contained in the previous MAC data frame of step 118.

With cross-layer ACK, the number of total messages may be reduced from four to two as illustrated in FIG. 1B. The use of cross-layer ACK may assist in the reduction of total bits to be transmitted, since each message may contain a MAC header, MAC footer, PHY header, and PHY footer, among other things. In addition, the reduction of messages may reduce the potential of channel collisions over the air. In total, the reductions may improve performance in terms of latency, throughput, and energy consumption, among other things.

Figure 2:
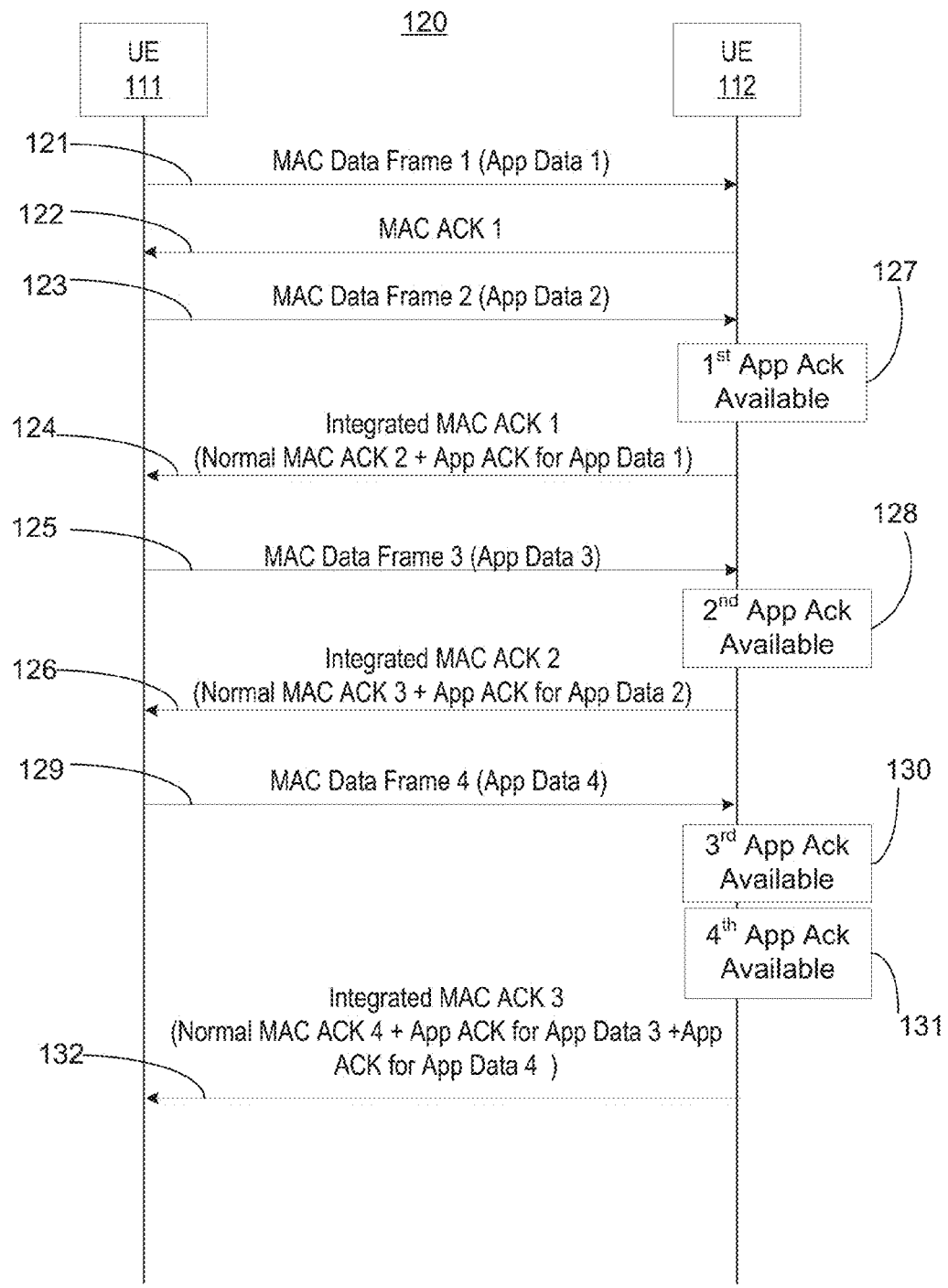
FIG. 2 a single-hop message flow with use of streamlined cross-layer ACK.

In FIG. 1B, it may take UE 112 time to calculate application ACK (hereinafter also App ACK). Thus, in an implementation of cross-layer ACK the integrated MAC ACK may not be issued until the paired App ACK becomes available. FIG. 2 illustrates a message flow 120 for a "streamlined cross-layer ACK," which an App ACK is not necessarily paired with the MAC ACK that is associated with the MAC frame that carried the application data. At step 121, UE 111 sends to UE 112 a MAC data frame that includes first application data. At step 122, UE 112 sends to UE 111 a MAC ACK with regard to the received MAC data frame of step 121. At step 123, UE 111 sends to UE 112 a MAC data frame that includes second application data.

With continued reference to FIG. 2, at step 127, App ACK for application data of step 121 becomes available on UE 112. At step 124, UE 112 sends to UE 111 an integrated MAC ACK that includes a MAC ACK for the MAC data frame of step 123 as well as an App ACK for first application data of step 121. At step 125, UE 111 sends to UE 112 a MAC data frame that includes third application data. At step 128, App ACK for application data of step 123 becomes available on UE 112. At step 126, UE 112 sends to UE 111 an integrated MAC ACK that includes a MAC ACK for the MAC data frame of step 125 as well as an App ACK for second application data of step 123.

With reference to FIG. 2, additional steps illustrate that UE 112 may hold multiple App ACKs and piggyback them together in one immediate MAC ACK, if the multiple App ACKs become available within a threshold time interval. At step 129, UE 111 sends to UE 112 a MAC data frame that includes fourth application data. At step 130, an App ACK for third application data of step 125 becomes available on UE 112. At step 131, an App ACK for fourth application data of step 129 becomes available on UE 112. At step 132, UE 112 sends to UE 111 an integrated MAC ACK that includes a MAC ACK for the MAC data frame of step 129 as well as an App ACK for third application data of step 125 and App ACK for fourth application data of step 129.

With reference to cross-layer ACK, in some cases there may be a delay when holding App ACK to be transmitted in the next integrated MAC ACK. This is generally not a significant issue for continuous or interactive applications such as voice, video streaming, and content sharing, among other things. In addition, to delay App ACK also may bring benefits from an application perspective. For example, to delay TCP ACK can help reduce window size at the sender. Research on wireless TCP has demonstrated that a TCP delay in this manner may mitigate or remove potential congestion (i.e., a TCP enhancement for wireless proximity communication).

Figure 3A:
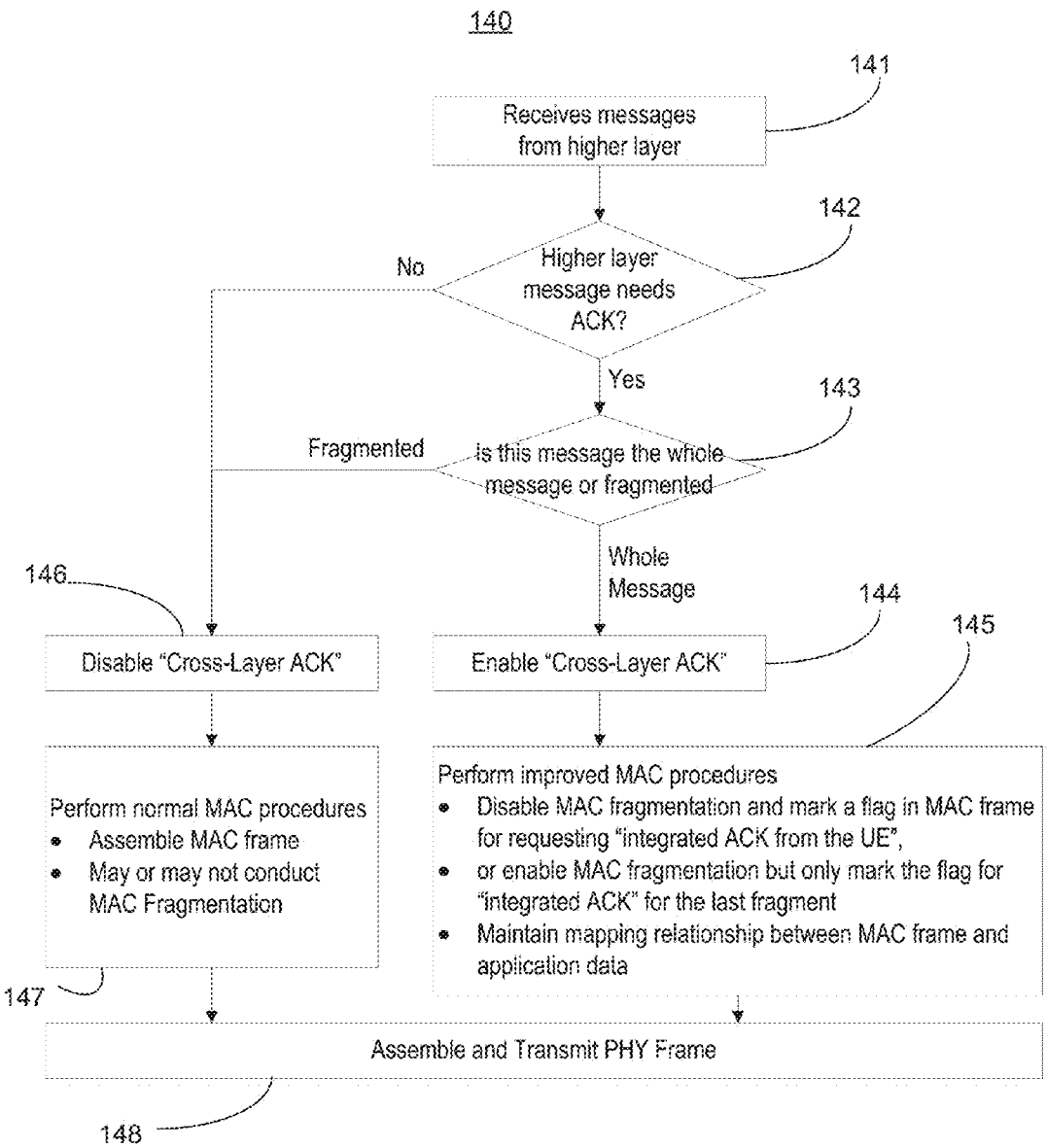
FIG. 3A illustrates an exemplary flow chart of a sending UE when messages are received from a higher layer for cross-layer ACK.
Figure 3B:
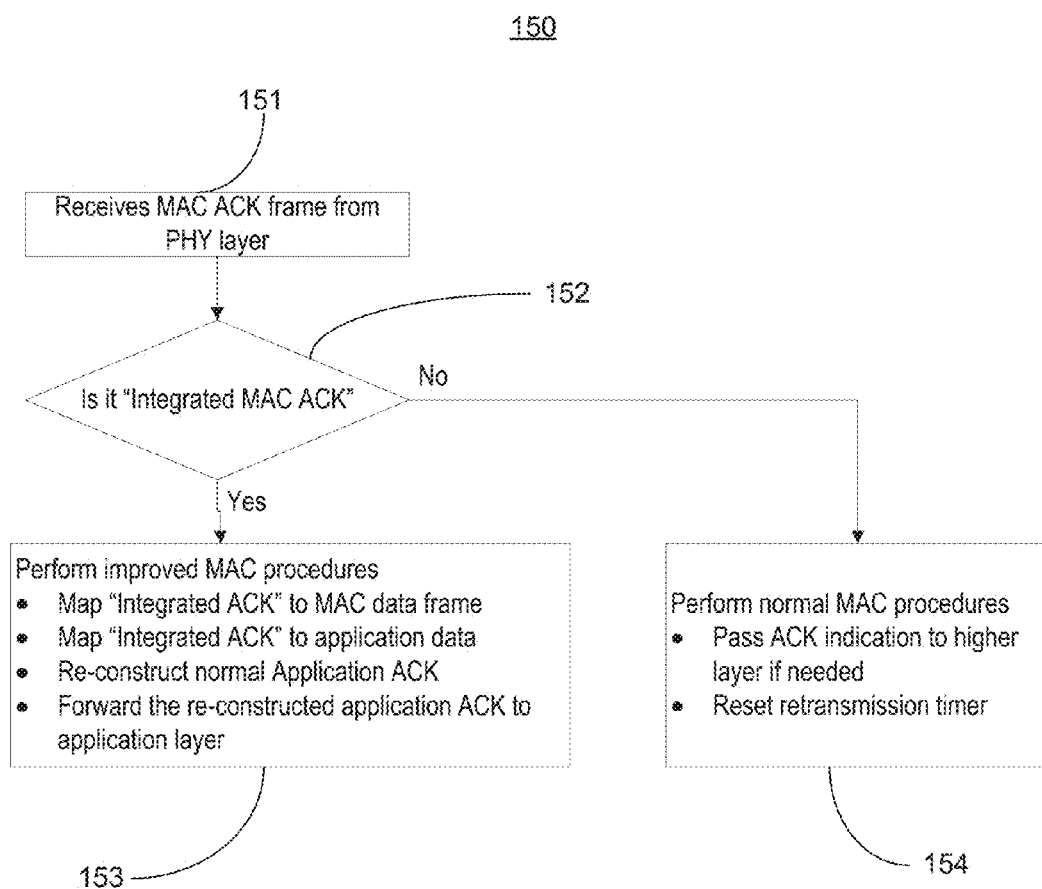
FIG. 3B illustrates an exemplary flow chart of a sending UE when messages are received from a physical layer for cross-layer ACK.

FIG. 3A and FIG. 3B illustrate flow charts of UE 111, which may be considered the sender for cross-layer ACK operation. FIG. 3A illustrates a flow chart 140 of lower layer (e.g., a MAC layer) of UE 111 receiving a message from a higher layer (e.g., application layer) of UE 111. At step 141, a message is received from a higher layer. At step 142, the MAC layer may determine whether a message needs an ACK. If the message needs an ACK, at step 143, the MAC layer may determine if the message is the whole message or fragmented message. If it is the whole message cross-layer ACK is enabled at step 144.

At step 145, after cross-layer ACK is enabled, cross-layer ACK MAC procedures are performed. The procedures may include, disabling MAC fragmentation and marking a flag in MAC frame for requesting integrated ACK from the receiver. Alternatively, fragmentation may be enabled and only marking the last fragment for integrated ACK. UE 111 may maintain a mapping relationship between MAC frame and application messages (i.e., higher layer data). At step 148, the message is sent via a PHY frame. In an embodiment, there may be an indicator that alerts the MAC layer whether a message from an application may be grouped with "applications" from different layers (e.g., layer 4 versus layer 5).

With reference to step 142 and step 143 of FIG. 3A, if the higher layer message does not need an ACK or if the message is fragmented, at step 146, cross-layer ACK may be disabled or not activated for the message. At step 147, conventional MAC procedures may be executed.

FIG. 3B illustrates a flow chart 150 of a MAC layer of UE 111 that receives a message from the PHY layer (e.g., a lower layer). At step 151, MAC layer of UE 111 receives a message from the PHY layer. At step 152, MAC layer determines if the MAC ACK frame is an integrated MAC ACK. If the MAC ACK frame is an integrated MAC ACK, at step 153, cross-layer MAC procedures are performed. At step 153, the integrated ACK is mapped to a MAC data frame. In addition, the integrated ACK is mapped to application data. Also in step 153, a conventional (i.e., normal) application ACK is reconstructed and the reconstructed application ACK is forwarded to the application layer. With reference to step 152, if the MAC ACK frame is not an integrated MAC ACK, then conventional MAC procedures are performed at step 154. If UE 111 does not receive an expected integrated MAC ACK or a normal MAC ACK from the receiver (UE 112) for a previously sent MAC frame, UE 111 retransmits the MAC frame till the retransmission time expires.

Figure 4:
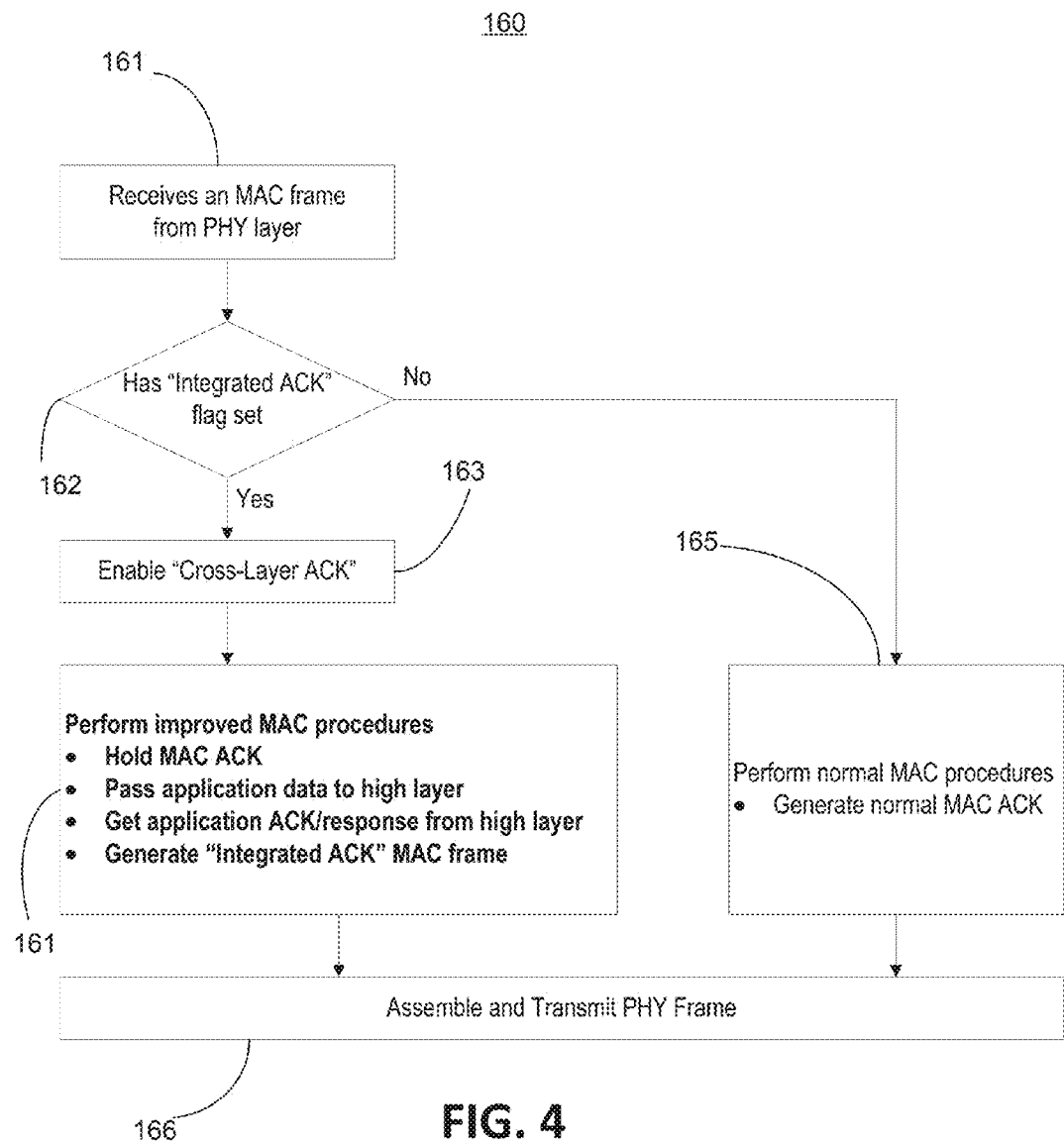
FIG. 4 illustrates a flow chart of a receiving UE for cross-layer ACK.

FIG. 4 illustrates a flow chart 160 of UE 112 (i.e., receiver) for cross-layer ACK operation. At step 161, MAC layer of UE 112 receives a MAC frame from PHY layer of UE 112. At step 162, UE 112 determines if an integrated ACK flag is set. If flag is not set then normal MAC procedures are performed at block 165. If an integrated ACK flag is set, then cross-layer ACK is enabled at step 163. At block 164, cross-layer MAC procedures are performed. Integrated MAC ACK procedures of step 164 includes passing application data to a higher layer. In addition, an application ACK or response is received from the higher layer. Also, integrated MAC ACK procedures of step 164 may include holding the MAC ACK for a threshold time until application ACK arrives. If UE 112 finds that the threshold time to get an application ACK has passed, UE 112 may disable cross-layer ACK and use normal MAC ACK procedures. Once application ACK is received an integrated ACK MAC frame may be sent. At step 166, the MAC ACK frame is transmitted via a PHY frame. Optionally, the UE 112 may independently determine to use normal ACK or cross-Layer ACK. Some or all steps in FIG. 3A, FIG. 3B, and FIG. 4 may be spread among one or more layers.

With reference to FIG. 4, in an embodiment, UE 112 may wait a set period before sending the integrated MAC ACK associated with step 161, which may be predetermined manually (e.g., set by a user) or automatically (e.g., automatically modified based on the type of application, such as video streaming application, chat application, health application, or the like).

Figure 5A:
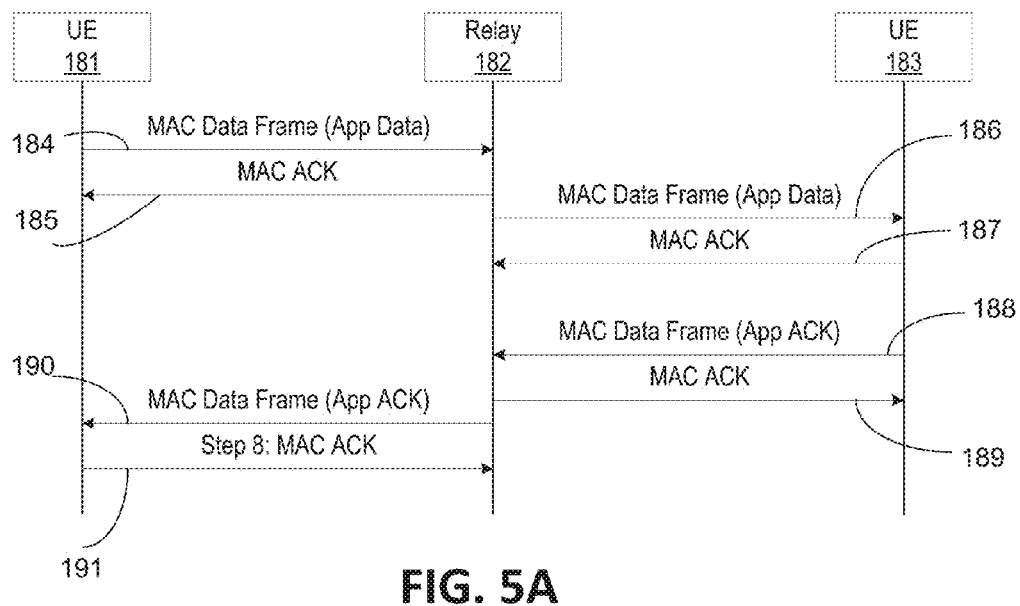
FIG. 5A illustrates a message flow of a multi-hop scenario without the use of cross-layer ACK.
Figure 5B:
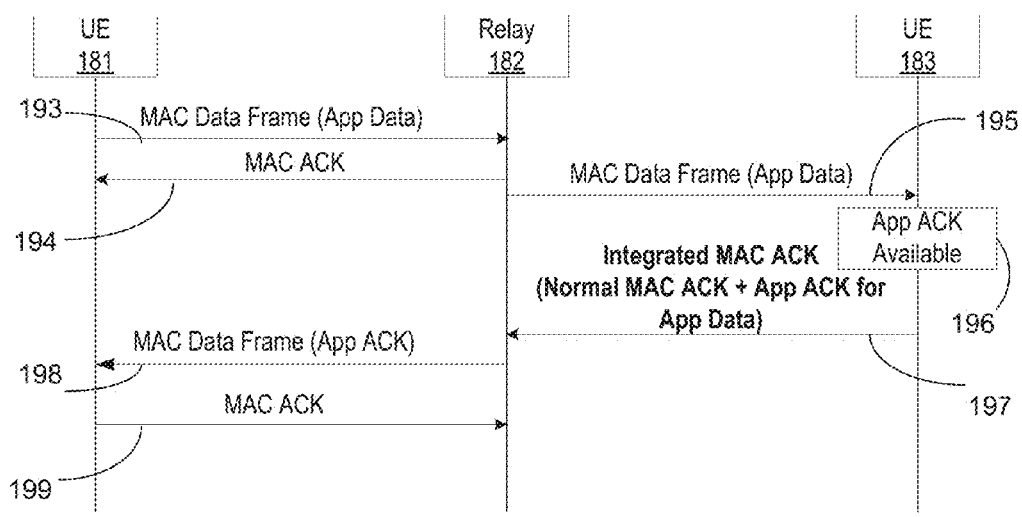
FIG. 5B illustrates a message flow of a multi-hop scenario with the use of cross-layer ACK.

FIG. 5A and FIG. 5B illustrate multi-hop scenarios where a relay 182 sits between a UE 181 and UE 183. FIG. 5A illustrates a multi-hop flow that does not use cross-layer ACK. At step 184, UE 181 sends to relay 182 a MAC data frame that includes first application data. At step 185, relay 182 sends to UE 181 a MAC ACK. At step 186, relay 182 forwards to UE 183 a MAC data frame that includes the first application data of step 184. At step 187, UE 183 sends to relay 182 a MAC ACK for the MAC data frame of step 186. At step 188, UE 183 sends to relay 182 a MAC data frame with an App ACK for the first application data received in step 186. At step 189, relay 186 sends to UE 183 a MAC ACK for the MAC data frame received in step 188. At step 190, relay 182 forwards a MAC data frame that includes an App ACK for the first application data of step 186 and step 184. At step 191, UE 181 sends to relay 182 a MAC ACK for the MAC data frame received in step 190.

FIG. 5B illustrates an exemplary multi-hop scenario using cross-layer ACK. At step 193, UE 181 sends to relay 182 a MAC data frame that includes first application data. At step 194, relay 182 sends to UE 181 a MAC ACK. At step 195, relay 182 forwards to UE 183 a MAC data frame that includes the first application data of step 193. At step 196, App ACK for first application data becomes available on UE 183. At step 197, UE 183 sends to relay 182 an integrated MAC ACK that includes MAC ACK for step 195 and App ACK for first application data of step 195 and step 193. At step 198, relay 182 sends to UE 181 a MAC data frame that includes the App ACK for first application data of step 193. There is no need to send an integrated MAC ACK because a MAC ACK was sent in step 194 for the MAC data frame of 193. At step 199, UE 181 sends to relay 182 a MAC ACK for the MAC data from received in step 198.

With reference to FIG. 5B, the MAC ACK frame for each hop may contain more information to support advanced features for improving reliable transmission. For example, a flag bit may be used to indicate if the corresponding data frame is to be forwarded or not. This bit can be set by UE 181 (if UE 181 uses source-based routing protocols) or UE 181 may be set by relay 182. There also may be more bits to indicate the number of hops. Relay 182, which is one hope away from UE 183, may determine whether to enable cross-layer ACK. UE 183 (the receiver) may independently determine whether to use cross-layer ACK.

Figure 6:
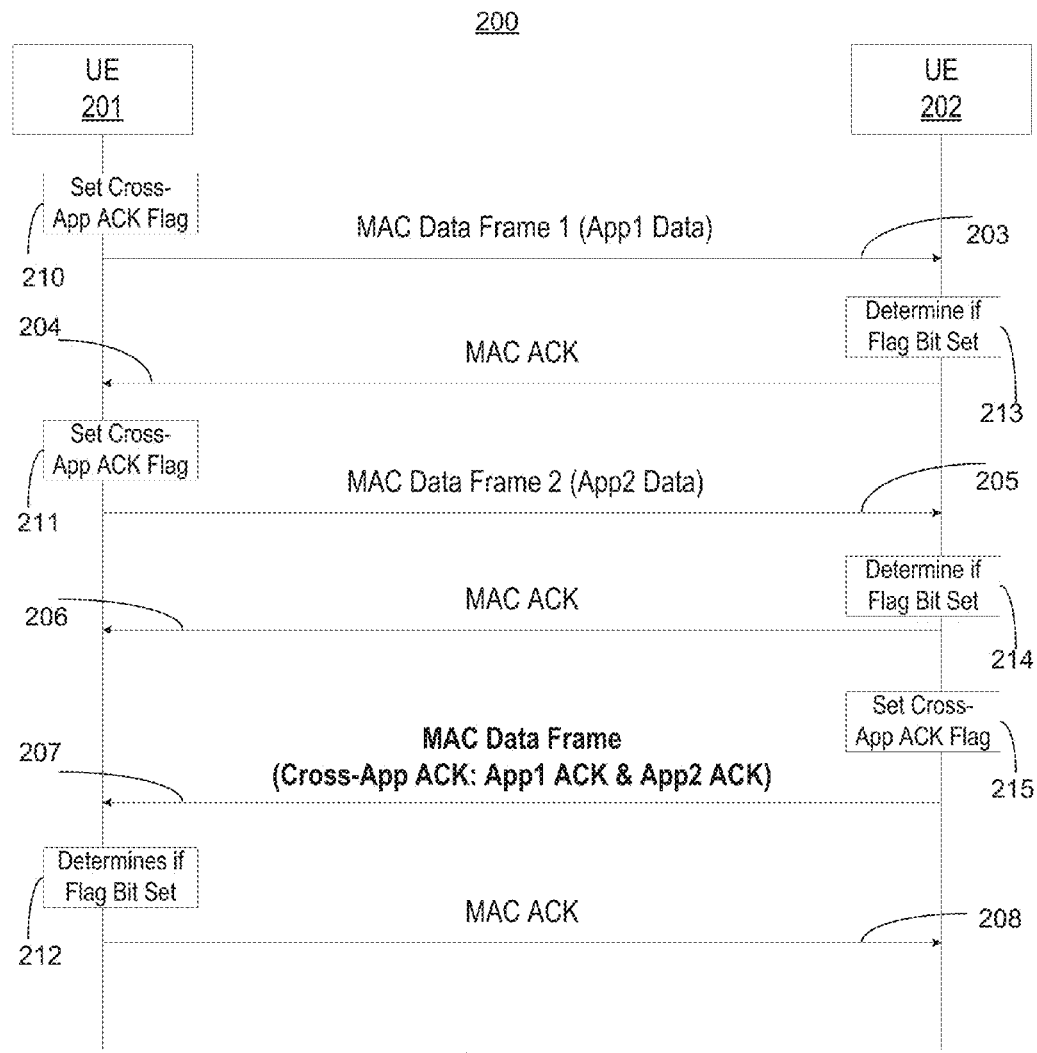
FIG. 6 illustrates a single-hop message flow that uses cross-application ACK.

Discussed in more detail below is cross-application ACK. For cross-application ACK, ACKs from different applications are integrated together and transmitted in the same MAC ACK frame. FIG. 6 illustrates another type of integrated ACK message flow 200 (a cross-application ACK message flow) between a UE 201 (sender) and UE 202 (receiver). It may be assumed that UE 201 and UE 202 simultaneously run multiple applications (e.g., Application 1 and Application 2) and are within one-hop.

With reference to FIG. 6, at step 210, UE 201 sets a cross-application ACK flag for Application 1 data. A cross-application ACK flag may be a bit in the header of a MAC data frame. The flag indicates whether the contained application data can be jointly acknowledged with other application data. At step 203, UE 201 sends to UE 202 a MAC data frame that includes Application 1 data with the cross-app ACK flag. At step 213, UE 202 determines whether there is a cross-application ACK flag bit set in the received MAC header of step 203. If the flag bit is set, then UE 202 marks application data 1 as a candidate for cross-application ACK. At step 204, UE 202 sends to UE 201 a MAC ACK for the MAC data frame of step 203.

At step 211, UE 201 sets a cross-application ACK flag for Application 2 data. At step 205, UE 201 sends to UE 202 a MAC data frame that includes Application 2 data with the set cross-application ACK flag. At step 214, UE 202 determines that there is a cross-application ACK flag bit set in the received MAC header of step 205 and UE 202 marks Application data 2 as a candidate for cross-application ACK. At step 206, UE 202 sends to UE 201 a MAC ACK for the MAC data frame of step 205.

At step 215, UE 202 sets a flag bit in the header of the MAC data frame of step 207 to indicate that a cross-application ACK is contained in the MAC data frame of step 207. At step 207, UE 202 sends to UE 201 a MAC data frame.

At step 208, UE 201 sends to UE 202 a MAC ACK for the MAC data frame of step 207. The MAC data frame of step 207 includes a cross-app ACK, which is used to acknowledge receiving of Application 1 data of step 203 and Application 2 data of step 205. Application 1 ACK and Application 2 ACK may be within the payload of the MAC data frame of step 207. At step 212, UE 201 determines that a flag (e.g., bit) is set in the MAC header that indicates cross-application ACK is being used in the MAC data frame of step 207. UE 201 decodes the MAC data frame and forwards the Application 1 ACK and Application 2 ACK to the corresponding applications in the higher layer.

MAC data frame of step 207 may include parameters that support cross-application layer ACK, such as cross-application ACK flag, number of application ACKs parameter (in current frame and allowed threshold—maximum), and list of application IDs, among other things. For example, a number of applications parameter may indicate the number of application ACKs contained in the MAC data frame of step 207. An application ID may indicate the corresponding applications that the piggybacked ACK (i.e., the cross-layer ACK of step 207) belongs to.

Figure 7:
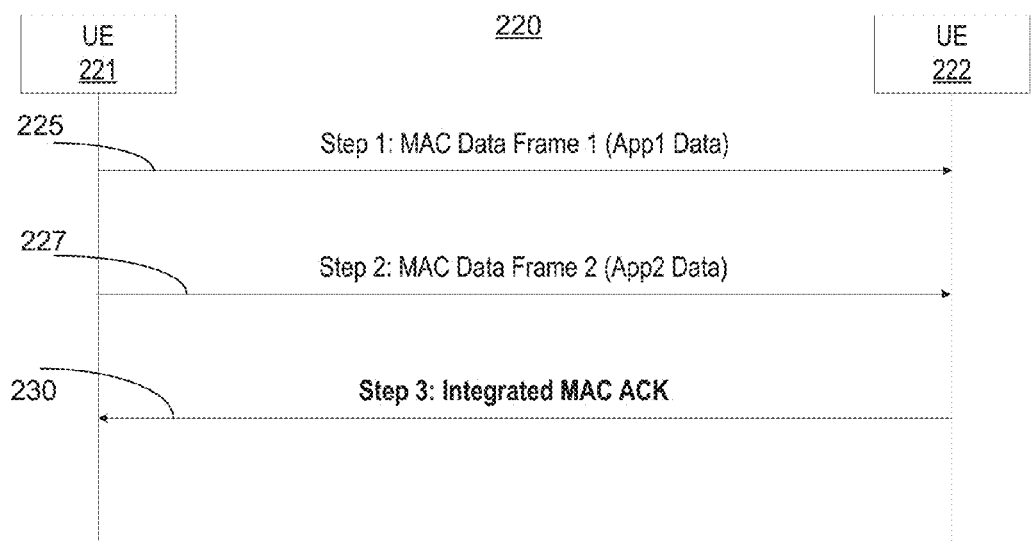
FIG. 7 illustrates a single-hop message flow with use of cross-layer cross-application ACK.

Discussed in more detail below is cross-layer cross-application ACK. For cross-layer cross-application ACK different layers and different applications are integrated as a single MAC-layer ACK. In other words, the single integrated MAC ACK is leveraged to acknowledge MAC frames and data from different applications. FIG. 7 illustrates a cross-layer cross-application message flow 220. It may be assume that UE 221 (sender) and UE 222 (receiver) simultaneously run multiple applications (e.g., Application 1 and Application 2). It also may assumed that UE 221 and UE 222 are in one hop and Application 1 and Application 2 implement application ACK for guaranteeing reliable transmission.

With reference to FIG. 7, at step 225, UE 221 sends to UE 222 a MAC data frame with Application 1 data. At step 227, UE 221 sends to UE 222 a MAC data frame with Application 2 data. The MAC data frames of step 225 and step 227 may include cross-app ACK flag, number of applications parameter, and list of application IDs, among other things as discussed herein. For example, UE 221 may set a flag bit in the MAC header of the MAC data frames of step 225 and 227 to alert UE 222 that cross-layer cross-application may be enabled for Application 1 and Application 2.

At step 230, UE 222 sends to UE 221 an integrated cross-layer cross-application MAC ACK. There are multiple permutations of what may be included in the MAC ACK of step 230. In a first option, the integrated cross-layer cross-application MAC ACK of step 230 may include a conventional MAC ACK in response to MAC data frame of step 227 and an application ACK for Application 1 data of step 225. For the first option, UE 222 does not need to wait for calculating an application ACK for Application 2 data. UE 222 issues a MAC ACK immediately after receiving MAC data frame of step 227 and piggybacks application ACK for Application 1 data of step 225, because it is available to be transmitted at the same time of the MAC ACK.

With continued reference to FIG. 7, in a second option at step 230, the integrated cross-layer cross-application MAC ACK includes acknowledgements of MAC data frames and Applications of step 225 and 227. It is assumed that all ACKs in FIG. 7 have arrived within a threshold period before transmission at step 230.

Discussed below are exemplary flows for implementations using constrained application protocol (CoAP) in combination with the methods and system disclosed herein. CoAP is an application layer protocol that may be used in resource-constrained Internet devices, such as wireless sensor network nodes. Details on how CoAP ACK (i.e., application ACK) and IEEE 802.15.4 ACK (i.e., MAC ACK) are discussed below.

Figure 8A:
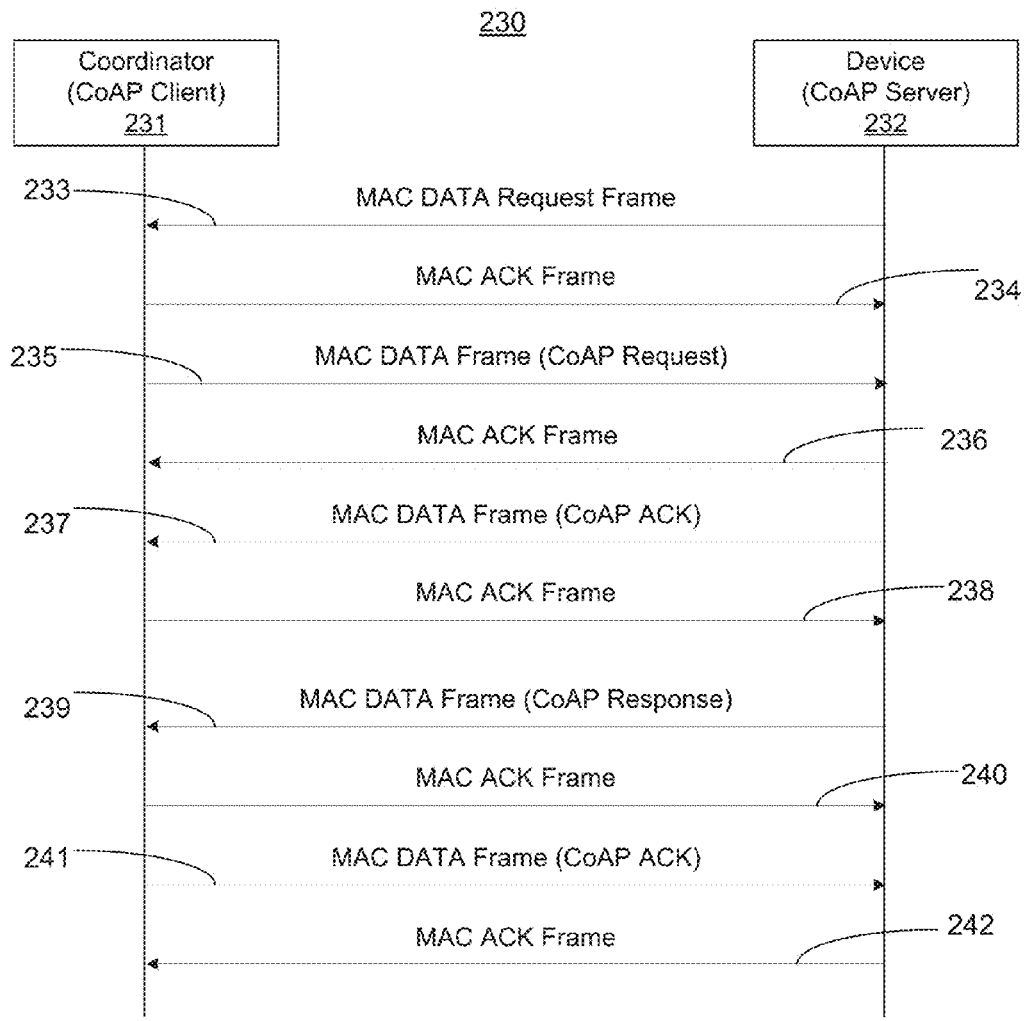
FIG. 8A illustrates a single-hop message flow of CoAP over IEEE 802.15.4 Networks without the use of cross-layer ACK.

FIG. 8A illustrates a conventional ("normal") CoAP message flow 230 using 802.15.4 and not using any cross-layer ACK or cross-application ACK. Coordinator 231 is a CoAP client and device 232 is a CoAP server. At step 233, device 232 sends to coordinator 231 a MAC data request frame. At step 234, coordinator 231 sends to device 232 a MAC ACK for the MAC data request frame of step 233. At step 235, coordinator 231 sends to device 232 a MAC data frame comprising a CoAP request. At step 236, device 232 sends to coordinator 231 a MAC ACK for the MAC data frame of step 235. At step 237, device 232 sends to coordinator 231 a CoAP ACK for the CoAP request of step 235. At step 238, coordinator 231 sends to device 232 a MAC ACK for the MAC data frame of step 237. At step 239, device 232 sends to coordinator 231 a MAC data frame comprising a CoAP response for the CoAP request of step 235. At step 240, coordinator 231 sends to device 232 a MAC ACK for the MAC data frame of step 239. At step 241, coordinator 231 sends to device 232 a MAC data frame comprising a CoAP ACK for CoAP response of step 29. At step 242, device 232 sends to coordinator 242 a MAC ACK for the MAC data frame of step 241.

Figure 8B:
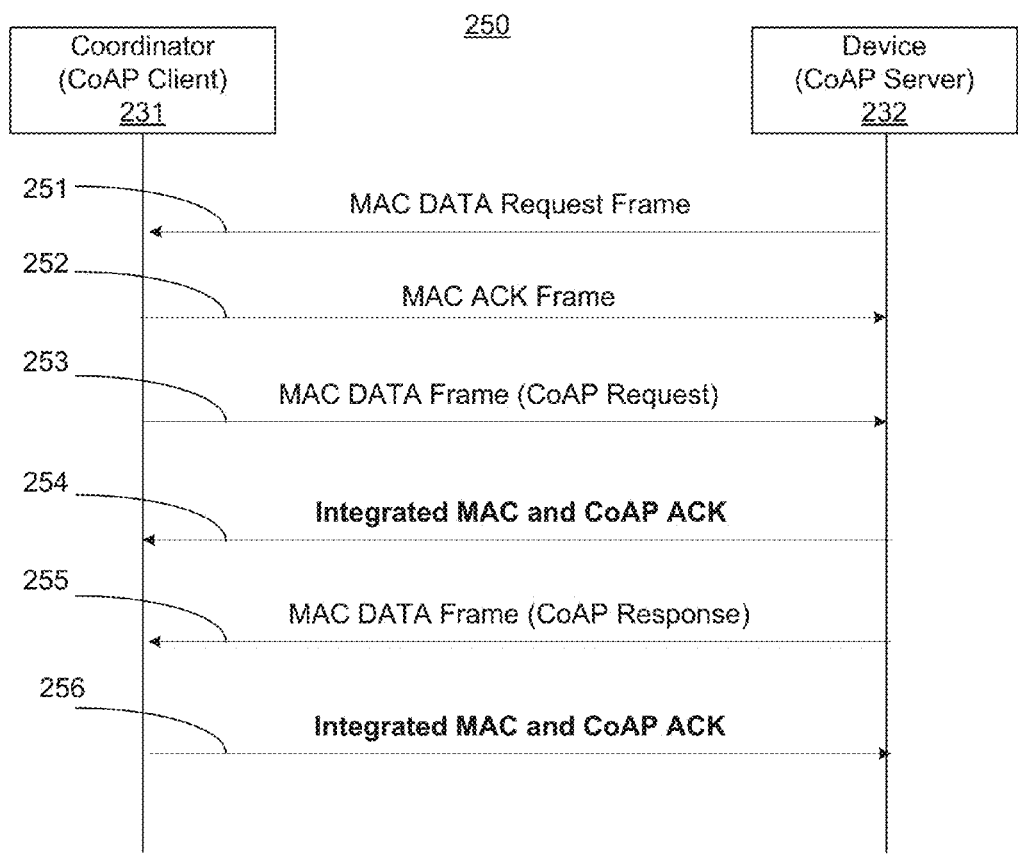
FIG. 8B illustrates a single-hop message flow of CoAP over IEEE 802.15.4 Networks with the use of cross-layer ACK.

FIG. 8B illustrates a cross-layer ACK CoAP message flow 250. At step 251, device 232 sends to coordinator 231 a MAC data request frame. At step 252, coordinator 231 sends to device 232 a MAC ACK for the MAC data request frame of step 251. At step 253, coordinator 231 sends to device 232 a MAC data frame comprising a CoAP request. At step 254, device 232 sends to coordinator 231 a cross-layer ACK for the MAC data frame and CoAP request of step 253. At step 255, device 232 sends to coordinator 231 a MAC data frame comprising a CoAP response. At step 256, coordinator 231 sends to device 232 cross-layer ACK for the MAC data frame and CoAP response of step 255.

FIG. 8B, which uses cross-layer ACK, illustrates a reduction of messages compared to FIG. 8A which does not use cross-layer ACK. In FIG. 8A there are 10 steps, while in FIG. 8B there are 6 steps.

As discussed above there may be additional fields or parameters added in order to implement cross-layer, cross-application, and cross-layer cross-application acknowledgment. Table 1 presents examples of some of the fields that may be used in a MAC frame. For example, there may be a cross-layer ACK bit in MAC data frame header to indicate that the current MAC data frame expects or requests an integrated MAC ACK. There may be a cross-layer ACK bit in MAC ACK frame header to indicate that the current MAC ACK is an integrated MAC ACK frame.

TABLE 1

Exemplary Additional Parameters for MAC Frame

| Methods | MAC Data Frame | MAC ACK Frame |
|---|---|---|
| Cross-Layer ACK | Cross-Layer ACK Flag: indicates if this MAC data frame expects or requests an "Integrated MAC ACK" Forwarding Flag: indicates if the current MAC Data frame needs to be forwarded for further hops. Number of Hops: indicates the number of remained hops that the current MAC Data frame needs to be forwarded. | Cross-Layer ACK Flag: indicates if this ACK is an Integrated MAC ACK frame. App IE: contains the App ACK or App Data. |
| Cross-Application ACK | Cross-App ACK Flag: indicates if the MAC data frame contains cross-app ACK. Number of App ACK: indicates the number of App ACK contained in the current MAC data frame. List of Application IDs: each application ID indicates the corresponding application, which the piggybacked ACK belongs to. Layer of application: May be indicator of what layer the application is on. For example layer 4 (e.g., TCP) or layer 5 (e.g., CoAP) | (Assumes MAC ACK Frame sent separately.) |
| Cross-Layer Cross-Application ACK | Cross-Layer Cross-App ACK Flag: indicates if this MAC data frame expects or requests a "Cross-Layer Cross-App ACK" | Cross-Layer Cross-App ACK Flag: indicates if this ACK is a Cross-Layer Cross-App ACK frame. App IE: contains a list of App ACK and/or App Data. |

Figure 9:
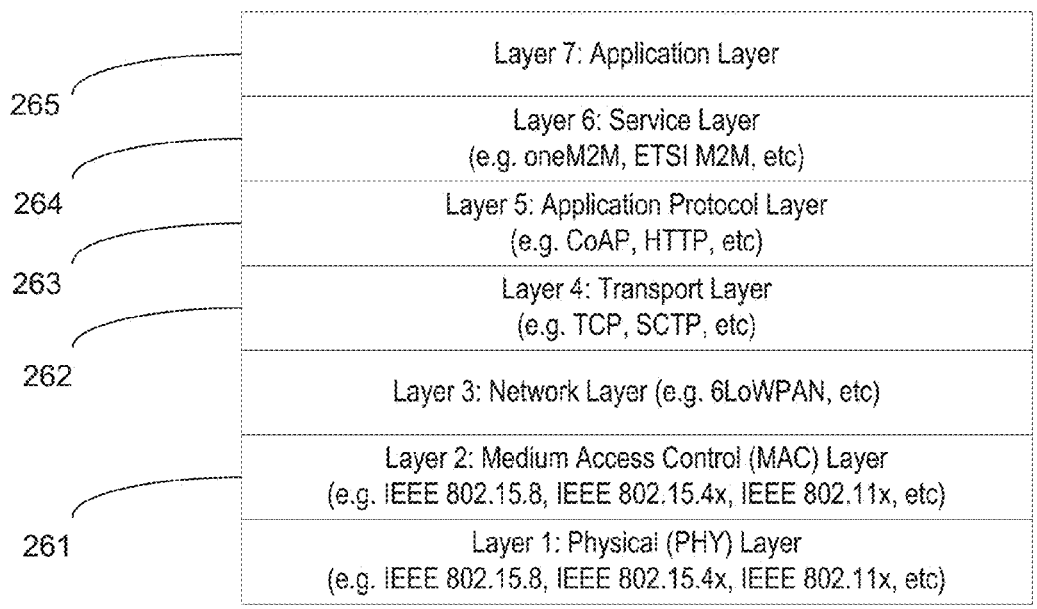
FIG. 9 illustrates an exemplary protocol stack of a user equipment that may use integrated acknowledgments.

FIG. 9 illustrates an exemplary protocol stack 261 of a user equipment (e.g., UE 111 or UE 112) that may use cross-layer or cross-application ACK and may be involved in proximity communications. As mentioned above, the application layer (i.e. higher layer), as discussed herein, may include, transport layer 262, application protocol layer 263, service layer 264, application layer 265, or other layers higher than the MAC layer.

Figure 10A:
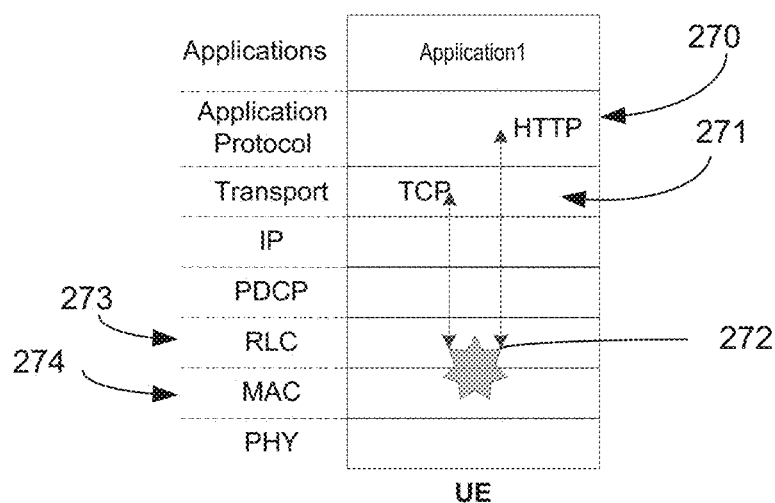
FIG. 10A illustrates integrated ACKs using a 3GPP LTE Uu interface user plane protocol stack.
Figure 10B:
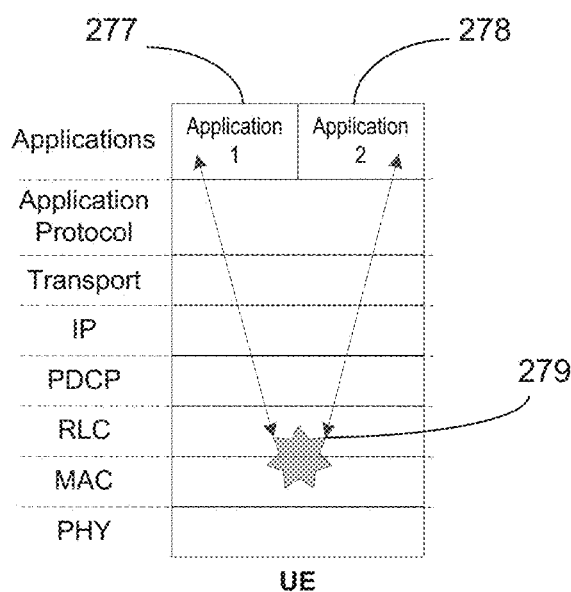
FIG. 10B illustrates integrated ACKs using a 3GPP LTE Uu interface user plane protocol stack.

FIG. 10A and FIG. 10B illustrate integrated ACKs as discussed herein using a 3GPP LTE Uu interface user plane protocol stack. As illustrated in FIGS. 10A and 10B, 3GPP may include an applications layer, application protocol layer, transport layer, Internet protocol (IP) layer, packet data convergence control (PDCP) layer, radio link control (RLC) layer, media access control (MAC) layer, and physical (PHY) layer. The disclosed integrated ACK may be implemented as a part of 3GPP RLC and 3GPP MAC to enhance system performance via the disclosed integrated ACK methods. Some or all of the MAC level procedures as discussed above (e.g., FIG. 3A, FIG. 3B, FIG. 4, etc.) may be done using the RLC layer 273 or MAC layer 274. Here, point 272 indicative of at least portion of the integrated ACK related MAC procedures are done using RLC layer 273 and MAC layer 274. TCP 271 and HTTP 270 may use an integrated ACK, in which point 272 distributes ACKs to different layers. FIG. 10B illustrates another example of multiple applications (application 277 and application 278), but at the same layer. Application 277 and Application 278 may use an integrated ACK, in which point 279 distributes ACKs to different layers.

Figures 11A, 11B:
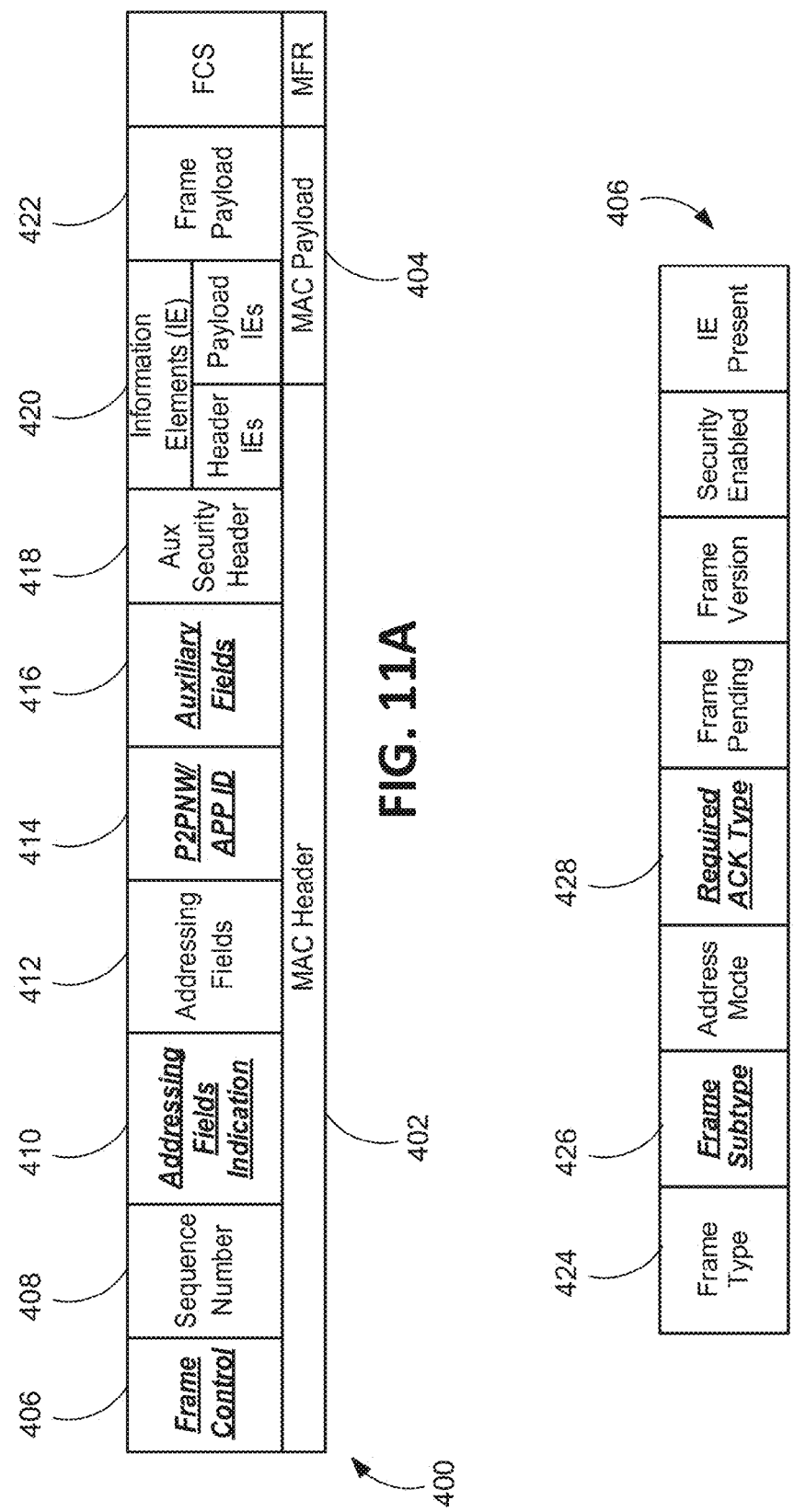
FIG. 11A illustrates an exemplary, non-limiting modified and/or extended general MAC frame format according to an embodiment.
FIG. 11B illustrates an exemplary, non-limiting frame control field format according to an embodiment.

FIG. 11A illustrates one embodiment of a modified MAC frame format 400 that may be used in connection with the cross-layer and cross-application acknowledgement procedures described herein. In FIGS. 11A and 11B, fields indicated in bold, italic, and underline are new or modified fields and may include new sub-fields. Other fields may have the same meaning as defined in the existing IEEE 802.15.4 and 802.11 standards.

As shown, the frame 400 generally comprises a MAC header 402 and MAC payload 404. In one embodiment, all fields in the frame may be required except the auxiliary fields 416 and auxiliary security header 418. In an embodiment, the sequence number field 408 and auxiliary security header 418 may have the same meaning as defined in the IEEE 802.15.4 standard.

In this embodiment, the frame control field 406 carries control information, such as the frame type, required type of acknowledgement message, and addressing mode. FIG. 11B illustrates one embodiment of a format 400 of the frame control field. In an embodiment, the frame type, frame pending, frame version, security enabled, and IE present fields may have the same meaning as defined in the IEEE 802.15.4 standard. In one embodiment, all the fields in this frame control field 406 may be mandatory.

Frame type and subtype fields 424, 426 may be mandatory and together may indicate the type of a frame, i.e., the function of a frame. In one embodiment, there are four basic frame types: beacon, management, data, and acknowledgement. Each type of frame may have several subtypes. In addition, the meaning of subtype fields may vary for different frame types. In one embodiment, the acknowledgement frame type may be used to designate frames for use in the cross-layer and cross application acknowledgement procedures described herein. Table 2 illustrates one embodiment of frame type 424 and frame subtype 426 values for acknowledgment frames. As shown, subtypes "4," "5," and "6" may, in one embodiment, be used to designate frames for use in cross-layer, cross-application, and both cross-layer and cross-application acknowledgements.

TABLE 2

Type and Subtype Combinations for ACK Frame

| Frame Type Value | Frame Type | Frame Subtype Value | Frame Subtype |
|---|---|---|---|
| 3 | ACK | 0 | Individual ACK |
| | | 1 | Aggregated ACK |
| | | 2 | Conditional ACK |
| | | 3 | Group ACK |
| | | 4 | Cross-layer ACK |
| | | 5 | Cross-application ACK |
| | | 6 | Cross-layer and Cross-application ACK |
| | | 7 | Fragment incremental ACK (IACK) |

Referring still to FIG. 11B, in an embodiment, a required ACK type field 428 in the frame control field 406 may specify what type of acknowledge frame is expected. For example, the required ACK type field may be set as shown in Table 3 below.

TABLE 3

Values of the Required ACK Type Field 428

| Required ACK Type Value | Type of ACK Required |
|---|---|
| 0 | No ACK |
| 1 | Individual ACK |
| 2 | Aggregated ACK |
| 3 | Conditional ACK |
| 4 | Group ACK |
| 5 | Cross-layer ACK |
| 6 | Cross-application ACK |
| 7 | Cross-layer and Cross-application ACK |
| 8 | Fragment incremental ACK (IACK) |

Referring back to FIG. 11A, addressing fields may consist of one or more of a source address, a destination address, a transmitting hop address, and a receiving hop address. Source address and destination address fields may carry the source and destination address of a frame. Transmitting hop address and receiving hop address fields may be reserved for multi-hop scenarios, carrying the address information of the intermediate peers. A transmitting hop address is an address of the peer sending this frame. The receiving hop address is the address of the peer to receive this frame. The presence of a transmitting hop address and/or a receiving hop address field may be indicated by the addressing fields indication.

As shown in FIG. 11A, the MAC frame format 400 may further include an addressing fields indication field 410 that may contain an indication of the presence of a transmitting hop address and a receiving hop address in the addressing fields 412. While a source and destination address may always be present in addressing fields 412, the presence of a transmitting hop address and a receiving hop address may be optional for a multi-hop scenario. For example, for one-hop transmission, neither is present, for the first hop in a multi-hop transmission (i.e., the original source is sending the frame) only a receiving hop address is present and the transmitting hop address is the same as the source address, for the last hop in a multi-hop transmission only a transmitting hop address is present and the receiving hop address is the same as the destination address, and for other hops in a multi-hop transmission, both a transmitting hop address and a receiving hop address are included. In addition, a frame may be a relayed frame when the addressing fields indication is set up as in the last two examples (last hop and other hops).

As further shown in FIG. 11A, a P2PNW/APP ID field 414 field may contain a P2P network ID or application ID. All peers joining a P2P network (NW) may have a locally unique P2PNW/APP ID. If a P2PNW ID is not determined when a frame is sent, this field may carry an application ID. Because a P2PNW may be formed by an application or service, a P2PNW ID may be a network identifier that may be used to define and differentiate an application-specific P2PNW. Due to the distributed nature of proximity services, a P2PNW ID may be locally unique.

A P2PNW ID may include but is not limited to, a CAID or application ID that indicates the desired service or application (e.g., Facebook for social networking, Netflix for video streaming, etc.), location information indicating the location of the P2PNW, an ID of the peer that generated the P2PNW ID, and a network sequence number that may be used to differentiate existing P2PNWs with the same context information. A P2PNW ID may be generated using different structures, such as a concatenated structure where each piece of information is assigned with some information bits and all information pieces are concatenated or a parallel structure where all pieces of information are added together through some mathematical calculation, such as XOR and hash.

Based on different control schemes, a P2PNW ID may be generated and assigned by different parties in the network. In a centralized control scheme embodiment, a P2PNW ID may be generated by a Super virtual leader (VL) that then notifies the VL(s), or a VL may generate the P2PNW ID and broadcast it in a beacon to notify the SuperVL and other VLs. In a hybrid control scheme embodiment, a VL may generate a P2PNW ID and broadcasts it in a beacon to notify other VLs. In a distributed control scheme embodiment, a peer that wants to form a P2PNW (i.e., a peer that defines a new application frame) may generates a P2PNW ID and broadcast a beacon to notify every peer within the proximity of the P2PNW ID. A virtual leader (VL) is a peer that may be dynamically selected to represent, manage, and coordinate the P2P communications among a group of peers sharing the same proximity service, i.e. within a P2PNW. A super virtual leader is a virtual leader defined to coordinate all virtual leaders of P2PNWs in proximity for different proximity services. A virtual leader and super virtual leader may be used for the purposes of synchronization, power control, interference management, channel allocation, access control, or the like.

Still referring to FIG. 11A, an Auxiliary Fields field 416 may contain fields that are optional but important for some functionalities. For example, a context category field may be included that indicates an application or service category, such as emergency service, social networking, smart office, etc. As another example, a hopper indication field may be included that indicates whether a frame sender is willing to relay other frames for a multi-hop discovery process.

While 3GPP and 802.15 is described by way of background and may be used to illustrate various embodiments described herein, it is understood that implementations of the embodiments may vary while remaining within the scope of the present disclosure. One skilled in the art will also recognize that the disclosed embodiments are not limited to implementations using 802.15 or 3GPP as discussed above, but rather some or all may be implemented and integrated with other architectures and systems, such as ETSI M2M, oneM2M, MQTT, and other systems and architectures.

Figure 12A:
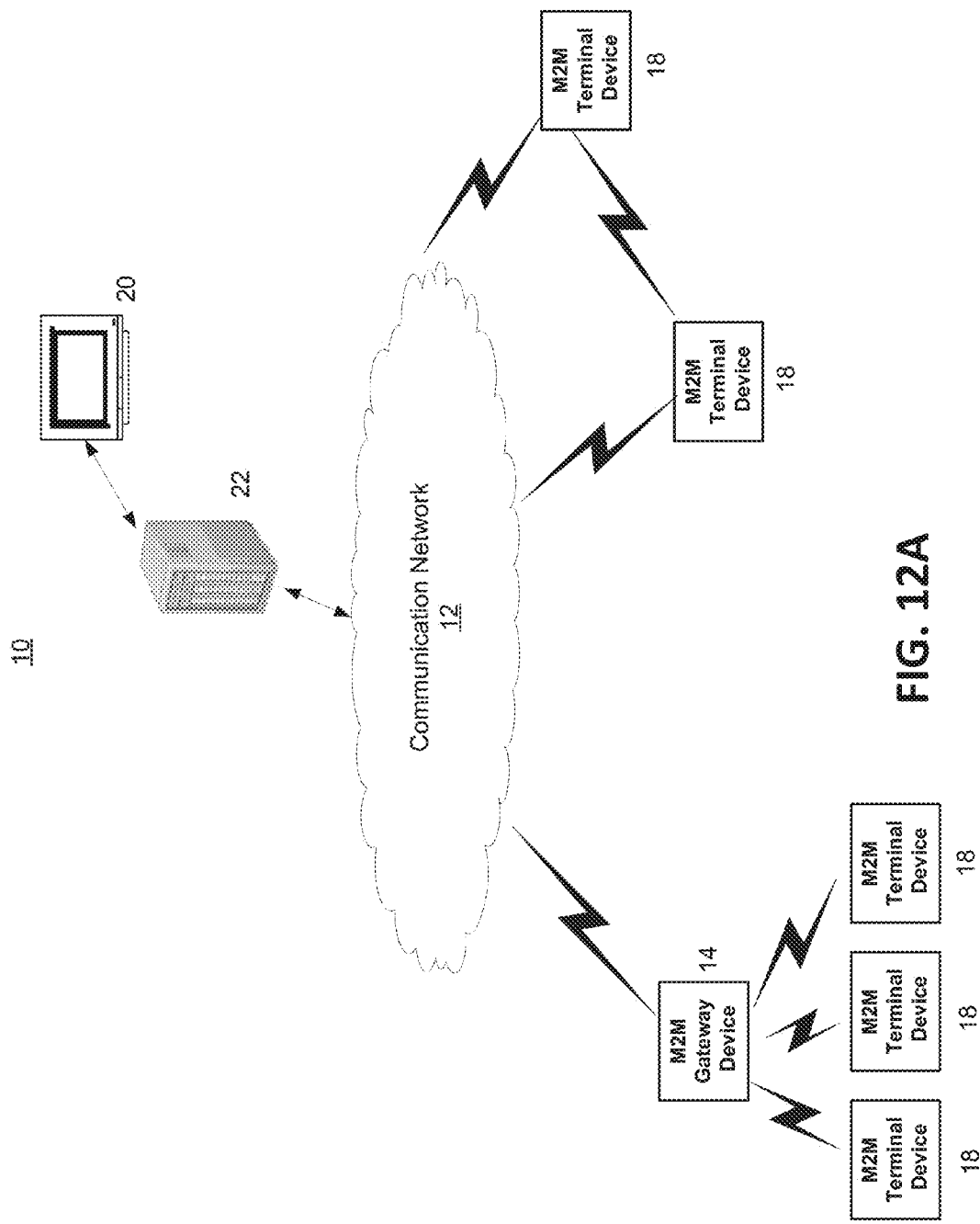
FIG. 12A is a system diagram of an example machine-to-machine (M2M) or Internet of Things (IoT) communication system in which one or more disclosed embodiments may be implemented.

FIG. 12A is a diagram of an example machine-to machine (M2M), Internet of Things (IoT), or Web of Things (WoT) communication system 10 in which one or more disclosed embodiments, such as FIG. 2, FIG. 5B, or FIG. 7, may be implemented. Generally, M2M technologies provide building blocks for the IoT/WoT, and any M2M device, gateway or service platform may be a component of the IoT/WoT as well as an IoT/WoT service layer, etc.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. In some embodiments, M2M gateway devices 14 and M2M terminal devices 18 may communicate using cross-layer ACK, cross-application ACK, or cross-layer cross-application ACK, as discussed herein. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 12B:
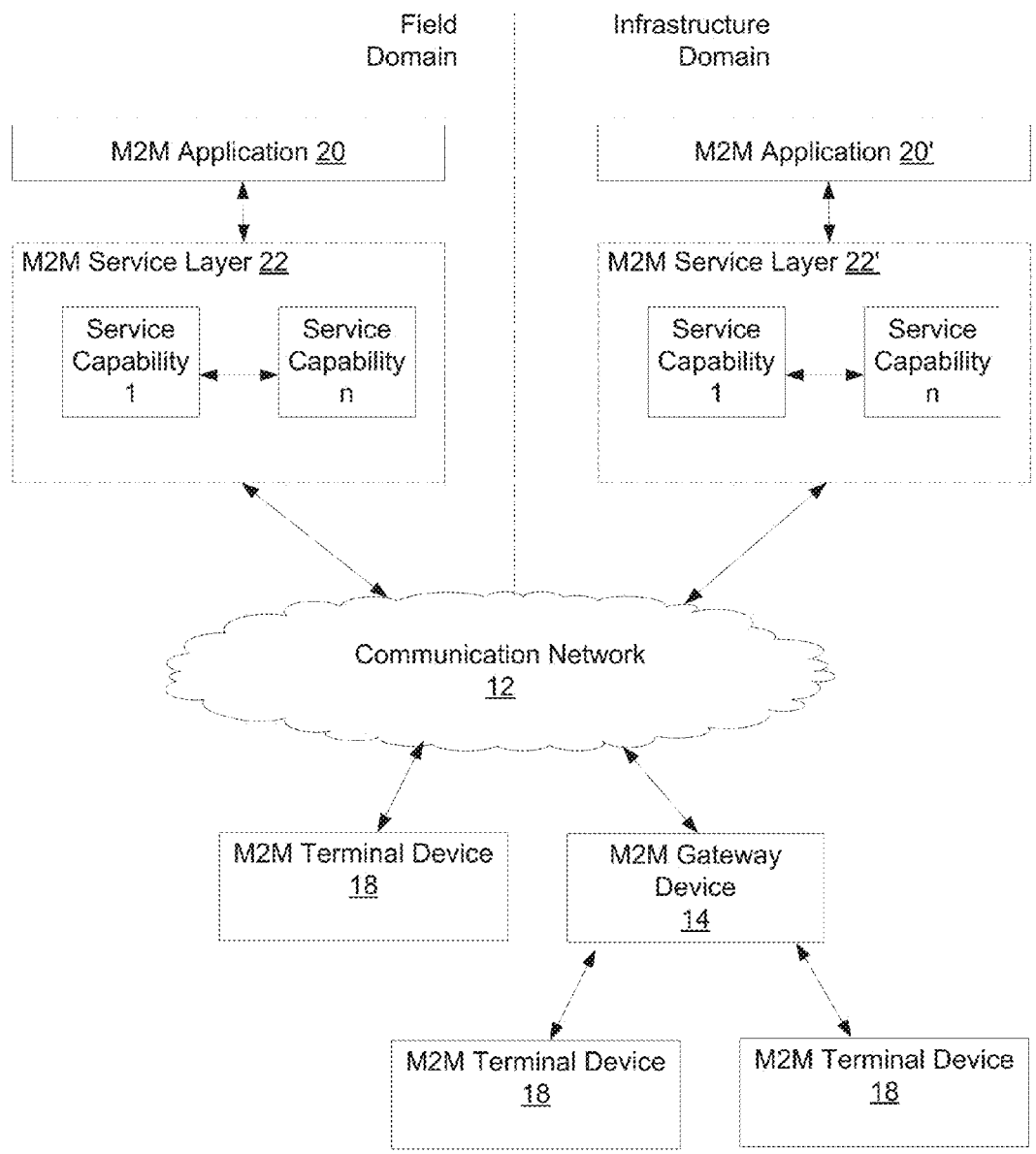
FIG. 12B is a system diagram of an example architecture that may be used within the M2M/IoT communications system illustrated in FIG. 12A.

Referring to FIG. 12B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 12B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some embodiments, M2M applications 20 and 20' may include desired applications that flag the use of cross-layer ACK, cross-application ACK, or cross-layer cross-application ACK, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The cross-layer ACK, cross-application ACK, or cross-layer cross-application ACK of the present application may be implemented as part of a service layer that uses ACKs. For example, a message from the service layer may have a flag that is indicative that cross-layer ACK is allowed for that service. The service layer is a software middleware layer that supports value-added service capabilities through a set of Application Programming Interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain components that work with cross-layer ACK, cross-application ACK, or cross-layer cross-application ACK of the present invention. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g., infrastructure node, middle node, application-specific node). Further, the present application may be implemented as part of an M2M network that uses a Service Oriented Architecture (SOA) and/or a resource-oriented architecture (ROA) to access services.

Figure 12C:
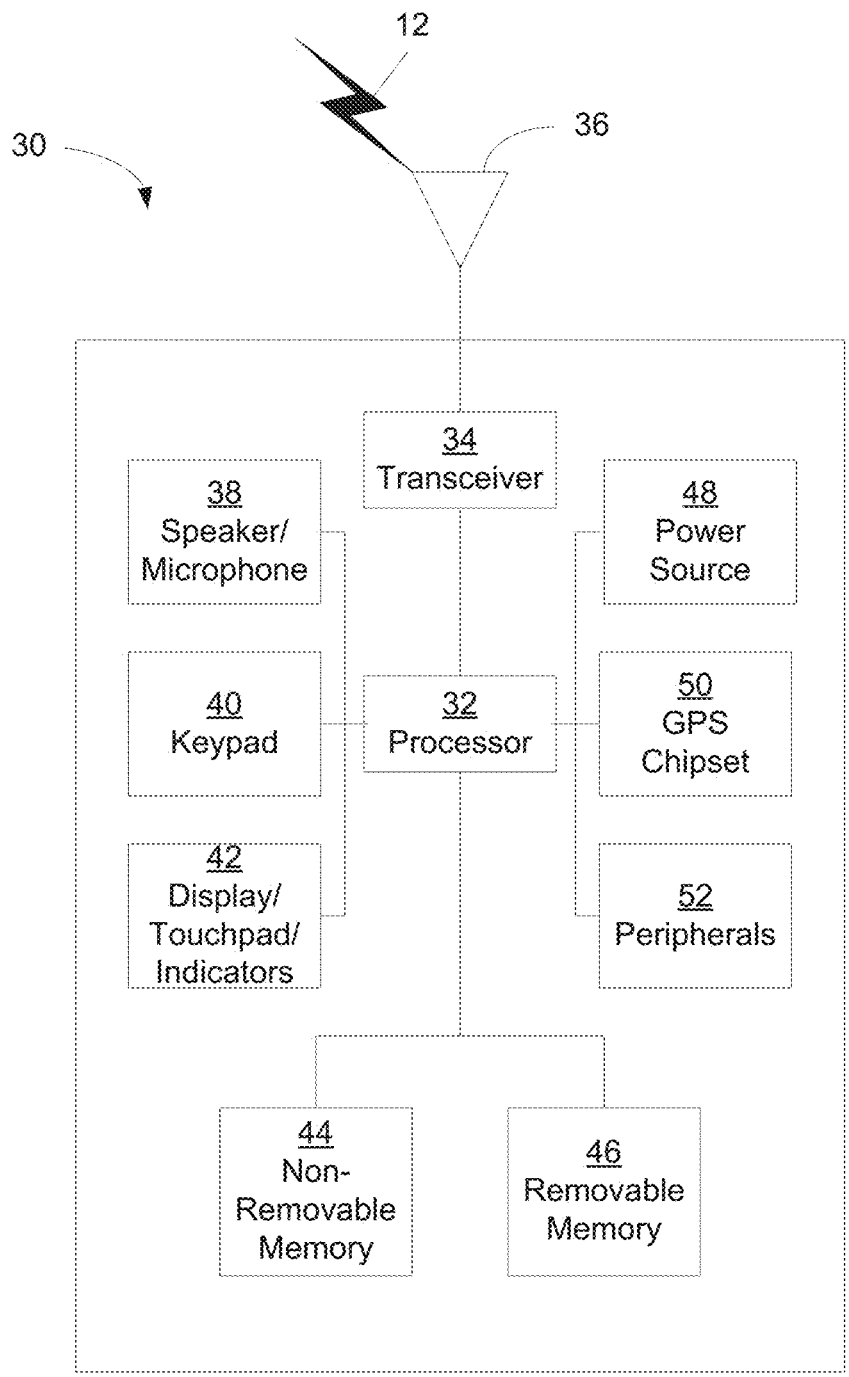
FIG. 12C is a system diagram of an example M2M/IoT terminal or gateway device that may be used within the communications system illustrated in FIG. 12A.

FIG. 12C is a system diagram of an example M2M device 30 (e.g., UE 111, UE 112, UE 221, UE 222, and the like), such as an M2M terminal device 18 or an M2M gateway device 14 for example. As shown in FIG. 12C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. This device may be a device that uses the disclosed systems and methods for cross-layer ACK, cross-application ACK, or cross-layer cross-application ACK.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 12C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to status or configuration of the cross-layer ACK, cross-application ACK, or cross-layer cross-application ACK. In some embodiments described herein a user interface, or the like, may allow configuring or triggering cross-layer ACK, cross-application ACK, or cross-layer cross-application ACKs. In some embodiments, capability of being used, a rejection based on a condition, number of application ACKs in an integrated ACK frame, or other status information may be displayed for cross-layer ACK, cross-application ACK, or cross-layer cross-application ACK, as discussed herein. Status information may include information regarding procedures throughout, such as procedures related FIG. 6 or FIG. 1B, among others.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12D:
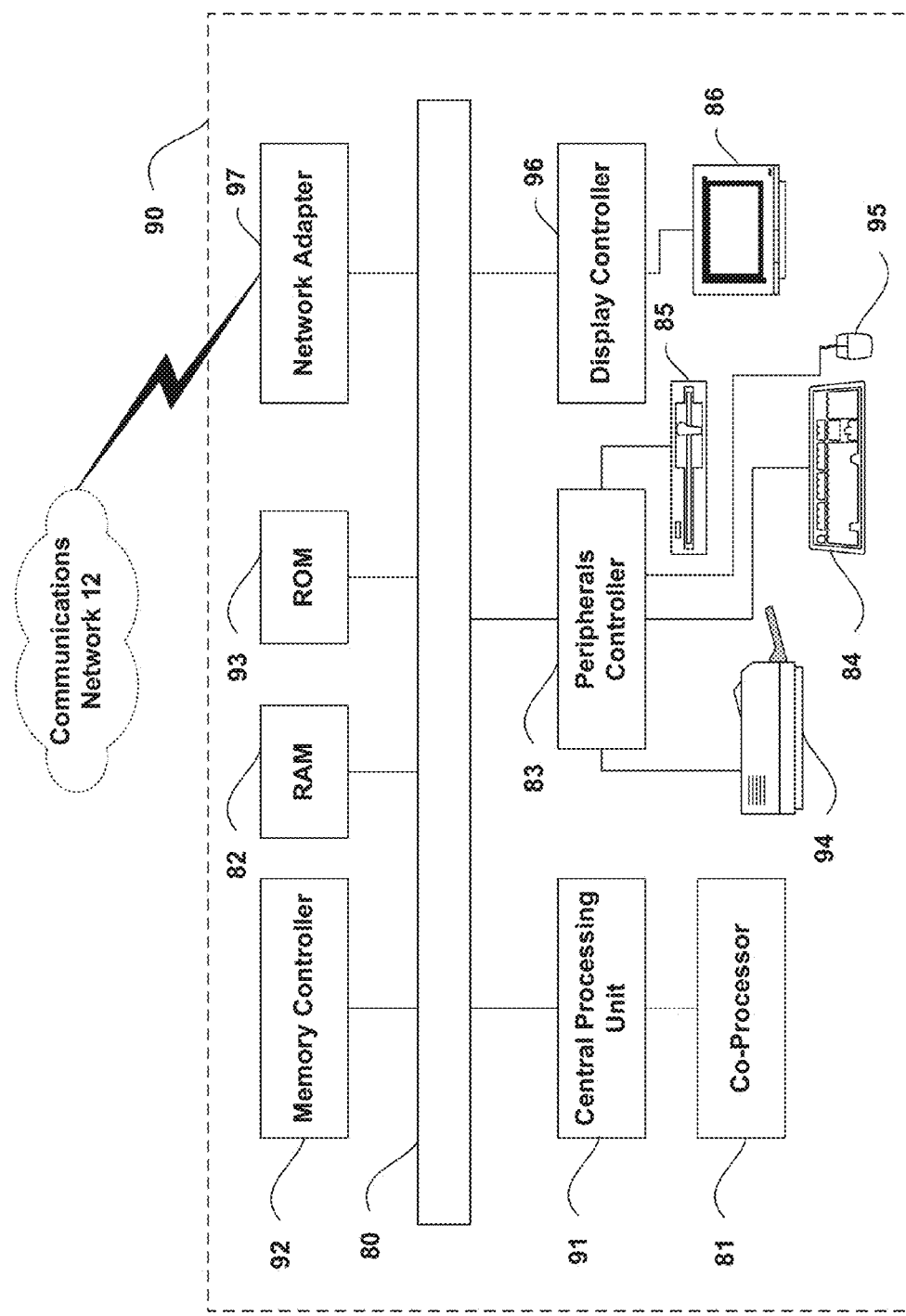
FIG. 12D is a block diagram of an example computing system in which aspects of the communication system of FIG. 12A may be embodied.

FIG. 12D is a block diagram of an exemplary computing system 90 on which, for example, the M2M service platform 22 of FIG. 12A and FIG. 12B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for cross-layer ACK, cross-application ACK, or cross-layer cross-application ACK, such as receiving combined ACKs of multiple layers and multiple applications.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 12A and FIG. 12B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A device comprising:
a processor; and
a memory communicatively connected with the processor, the memory having stored thereon executable instructions that when executed by the processor cause the processor to effectuate operations comprising:
receiving a first frame, the first frame comprising first medium access control data and first application data, wherein the first frame comprises a bit that is indicative of providing instructions to the device to send an integrated ACK frame; and
providing instructions to transmit an integrated ACK frame, the integrated ACK frame comprising an acknowledgment of the first medium access control data and an acknowledgment of the first application data.

2. The device of claim 1, wherein the integrated ACK frame is transmitted after waiting a threshold period for the availability of the acknowledgment of the application data.

3. The device of claim 1, wherein the application resides in at least one of an application protocol layer or an application layer.

4. The device of claim 1, wherein the integrated ACK frame further comprises a second medium access control data and a second application data, the second medium access control data and the second application data received in a second frame.

5. The device of claim 1, wherein the application resides in a service layer.

6. The device of claim 1, wherein the integrated ACK frame comprises a bit indicative of the number of application ACKs within the integrated ACK frame.

7. A device comprising:
a processor; and
a memory communicatively connected with the processor, the memory having stored thereon executable instructions that when executed by the processor cause the processor to effectuate operations comprising:
sending a first frame, the first frame comprising first medium access control data and first application data;
receiving an integrated ACK frame, the integrated ACK frame comprising an acknowledgment of the first medium access control data and an acknowledgment of the first application data; and
setting a bit for the first frame indicative that multiple acknowledgments are allowed in the integrated ACK frame, the allowed multiple acknowledgments comprising the acknowledgment of the first application data and an acknowledgment comprising at least one of:
the acknowledgment of the first medium access control data,
an acknowledgment of a second medium access control data, and
an acknowledgment of a second application data.

8. The device of claim 7, further operations comprising determining that the integrated ACK frame has a bit set, the bit indicative of a cross-layer ACK or cross-application ACK being used in the integrated ACK frame.

9. The device of claim 8, further operations comprising forwarding to a higher layer, by a MAC layer of the device, the acknowledgment of the first application data, wherein the forwarding is based on an application identifier associated.

10. The device of claim 7, wherein the integrated ACK frame further comprises an acknowledgment of a second application data, the acknowledgment of the second application data from an application that is different from the first application data.

11. The device of claim 7, wherein the first frame comprises a bit indicative of a maximum number of application ACKs allowed in the integrated ACK frame.

12. The device of claim 7, wherein the device is a relay.

13. The device of claim 7, wherein the first frame is sent to a receiver device in wireless proximity communication with the device.

14. The device of claim 13, wherein the receiver device is within one hop from the device.

15. A device comprising:
a processor; and
a memory communicatively connected with the processor, the memory having stored thereon executable instructions that when executed by the processor cause the processor to effectuate operations comprising:
  sending a first frame to a peer device via wireless communication, the first frame comprising first application data;
  sending a second frame to the peer device via wireless communication, the second frame comprising second application data;
  receiving an integrated ACK frame, the integrated ACK frame comprising an acknowledgment of the first application data and an acknowledgment of the second application data; and
  providing instructions to display an indication of a status of the integrated ACK on a user interface.

16. The device of claim 15, wherein the status of the integrated ACK comprises an amount of application acknowledgments within the integrated ACK.

17. The device of claim 15, wherein the status of the integrated ACK comprises an indication of whether acknowledgments within the integrated ACK are associated with the same application.

18. The device of claim 15, wherein the second application data is from an application that is different from the first application data.

* * * * *